United States Patent [19]
Karle et al.

[11] Patent Number: 4,982,330
[45] Date of Patent: Jan. 1, 1991

[54] ARRANGEMENT FOR DETECTING INPUT SIGNALS OF A CONTROL DEVICE IN AN INTERNAL COMBUSTION ENGINE

[75] Inventors: Anton Karle, Leonberg; Fridolin Piwonka, Tamm, both of Fed. Rep. of Germany

[73] Assignee: Robert Bosch GmbH, Stuttgart, Fed. Rep. of Germany

[21] Appl. No.: 221,463

[22] PCT Filed: Jul. 15, 1987

[86] PCT No.: PCT/DE87/00316
§ 371 Date: Jun. 9, 1988
§ 102(e) Date: Jun. 9, 1988

[87] PCT Pub. No.: WO88/02812
PCT Pub. Date: Apr. 21, 1988

[30] Foreign Application Priority Data
Oct. 10, 1986 [DE] Fed. Rep. of Germany ....... 3634583

[51] Int. Cl.[5] .............................................. G01F 7/76
[52] U.S. Cl. ......................... 364/431.03; 364/431.07; 364/565; 123/414; 123/480
[58] Field of Search ................. 364/431.039, 431.04, 364/431.12, 569; 123/414, 478, 480; 361/163, 168–170

[56] References Cited
U.S. PATENT DOCUMENTS

| 4,354,239 | 10/1982 | Kanegae | 364/569 |
| 4,365,602 | 12/1982 | Stiller et al. | 123/414 |
| 4,442,812 | 4/1984 | Mizuno et al. | 123/480 |
| 4,639,870 | 11/1987 | Otobe et al. | 364/431.04 |
| 4,702,213 | 10/1987 | Yasuoka | 123/480 |
| 4,751,650 | 6/1988 | Wazaki et al. | 364/431.03 |
| 4,797,827 | 1/1989 | Cockerham | 364/431.03 |
| 4,825,373 | 4/1989 | Nakamura et al. | 364/431.03 |

FOREIGN PATENT DOCUMENTS

| 0152288 | 2/1985 | European Pat. Off. . |
| 0162470 | 11/1985 | European Pat. Off. ............ 123/478 |
| 3009627 | 9/1981 | Fed. Rep. of Germany . |
| 3336028 | 4/1985 | Fed. Rep. of Germany . |

Primary Examiner—Parshotam S. Lall
Assistant Examiner—Michael Zanelli
Attorney, Agent, or Firm—Michael J. Striker

[57] ABSTRACT

An arrangement for the detection of speed signals of a control device controlling the fuel feed in an internal combustion engine is suggested, in which an (inductive) pulse generator is used in connection with a tested sensing arrangement. The point in time of the detection of the speed signal is freely controllable within a crankshaft and/or camshaft revolution. A minimization of the time interval between the signal detection and the output of the output signals dependent on the speed signals is accordingly achieved. In this way, the phase rotation in the control circuit is minimized and the dynamic behavior is accordingly decisively improved.

7 Claims, 4 Drawing Sheets

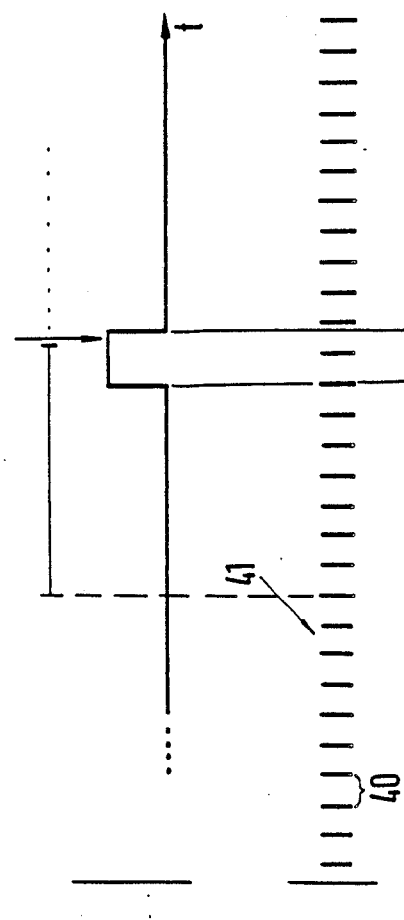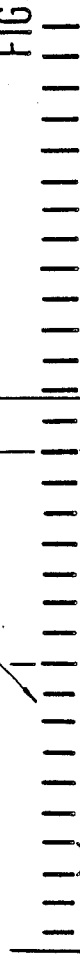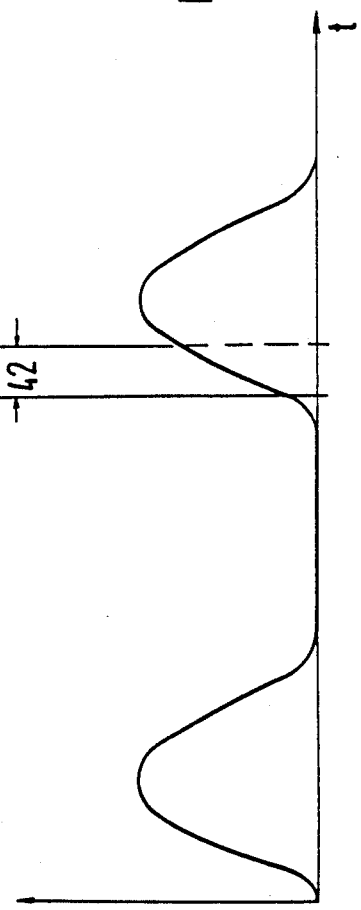

ARRANGEMENT FOR DETECTING INPUT SIGNALS OF A CONTROL DEVICE IN AN INTERNAL COMBUSTION ENGINE

PRIOR ART

The invention proceeds from an arrangement for determining actuating and control variables of an internal combustion engine. An arrangement is known from DE-OS 30 09 627 in which a multitude of output variables are calculated and made available from a multitude of input variables by means of an electronic device. In so doing, the input variables are continuously detected. The continuously detected input variables are sensed in constant time intervals in a computer-controlled manner and used for the calculation of the output variables. The rate of rotation and position of the crankshaft are detected in the known device by means of a resolver. This method of speed detection is expensive, costly and, above all, susceptible to disturbances, so that its use for controlling an internal combustion engine is unsatisfactory.

In addition, an arrangement is known from DE-OS 33 36 028 which counteracts the jarring which is brought about chiefly in diesel engines because of finite computing times, in that a separate control arrangement for proportioning fuel is provided for each cylinder. However, this control arrangement can only work in a satisfactory manner if the controlling devices provide very accurate and current speed information. In the case of an engine with Z-cylinders, a segmented wheel comprising Z-segments is arranged on the crankshaft for this purpose in the known arrangement. This solution entails considerable signal detection times which, in connection with the computer running time, can have disadvantageous consequences for the dynamics of the control arrangement.

It is the object of the invention, therefore, to make it possible to determine the speed at the latest possible point in time prior to the next fuel injection using an inductive or comparable pulse generator and a tested sensing arrangement.

ADVANTAGES OF THE INVENTION

In contrast to the aforementioned prior art, the arrangement, according to the invention, has the advantage that it is possible to determine the speed in a manner which is less costly and less susceptible to disturbance by using an incremental wheel in connection with an inductive pulse generator and the tested sensing arrangement. The phase rotation in the control circuit is minimized and the dynamic behavior is accordingly decisively improved by means of the shortest possible time interval between the detection of the speed signal and the output of the control signals.

DRAWING

The following drawings show an embodiment example of the invention. FIG. 1 shows a block circuit diagram including the elements necessary for actuating or controlling the operating variables of the internal combustion engine; FIG. 2 shows the increment transmitter with the respective sensor, the increment transmitter being constructed as a toothed wheel; FIGS. 3A, 3B and 3C show a time diagram with control signal for a solenoid valve, speed sensor signals and the cam lift; and FIG. 4 shows a flow chart of the process.

DESCRIPTION OF THE PREFERRED EMBODIMENTS

Figure 1:
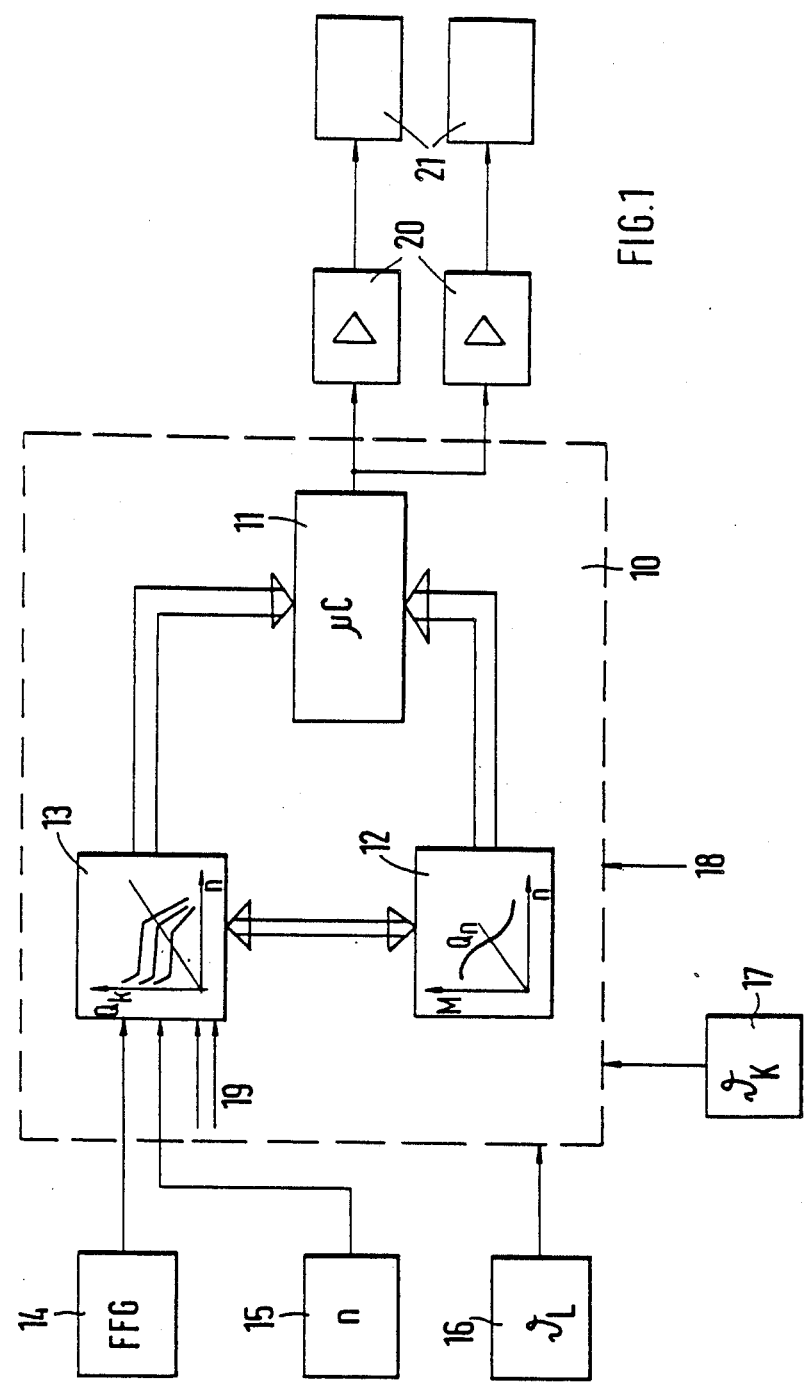

In FIG. 1, an electronic control device is designated by 10 and contains a characteristic field, designated by 13, for the determination of the fuel quantity in the diesel engine or the basic injection period in the gasoline engine, a characteristic field, designated by 12, for some limit or correction values, and a microcomputer, designated by 11. The characteristic fields 12 and 13 can also be connected with one another via a data line, but are also connected with the microcomputer 11. The signals of the accelerator position transmitter 14, the speed transmitter 15 and the temperature transmitters 16 and 17 are fed to the control device 10. Other operating parameters are supplied to the control device via the line 18, e.g. boost pressure or air pressure. The output of the control device is connected with various end stages 20 whose output signals serve to control the actuating devices 21. The actuating devices are, for example, a solenoid valve at a diesel fuel pump or fuel injection nozzles in the gasoline engine. The shown arrangement operates as follows: The signals of the accelerator position transmitter 14, the speed transmitter 15, the temperature transmitters for the air or the fuel temperature 16 and 17, as well as signals of other operating parameters, are fed to the control device 10. The characteristic field 13, which is at least two-dimensional, serves to determine a fuel quantity or injection period corresponding to the operating parameters of the internal combustion engine. In the simplest case, the signals of the accelerator position transmitter and the speed transmitter serve this purpose. However, a dependence on more than these two operating parameters is also conceivable. The additional operating parameters are indicated by arrows 19. The output signal of the characteristic field 13 is fed either to the characteristic field 12 for correction or directly to the microcomputer 11. It is fed to the characteristic field 12 in the diesel engine chiefly in full-load operation in order to prevent excessive smoking of the internal combustion engine for purposes of maintaining the cleanliness of the air. In the gasoline engine, a corrected value corresponding to the operating conditions is determined in the characteristic field 12 from the basic injection period. The corresponding signal also reaches the microcomputer 11. The microcomputer calculates the position in time and the duration of the control signals for the actuating devices 21 from the speed signal and a synchronization pulse as it will be explained below. These control signals are fed to the end stages 20 which deliver the output necessary for controlling the actuating devices.

Figure 2:
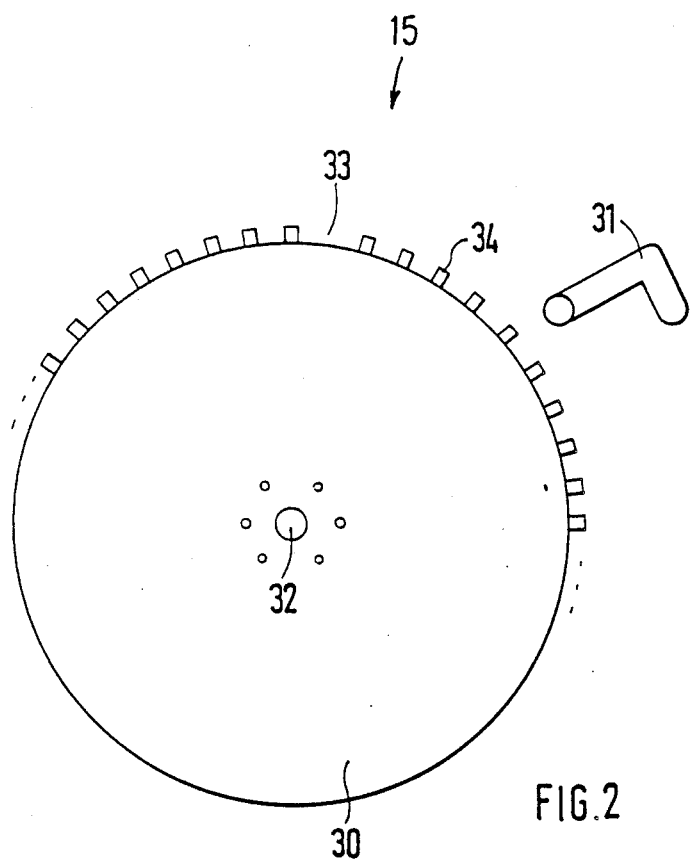

The speed transmitter 15 schematically illustrated in FIG. 2, includes a segmented or an incremental wheel designated by 30, and a sensor designated by 31; the crankshaft, on which the incremental wheel is fastened, is designated by 32, a synchronization mark is designated by 33, and respective increment generating teeth arranged on the incremental wheel are designated by 34.

The synchronization mark serves to generate the synchronization pulse indicating to the control device each new revolution of the crankshaft. A solution is also conceivable in which the incremental wheel is provided with a quantity of synchronization marks corresponding to the number of cylinders of the internal combustion engine. A high-resolution speed detection is possible by means of the transmitter 15 because the sensor sends a pulse each time a tooth 34 of the incremental wheel passes it.

FIGS. 3A to 3C illustrate the application of the method of the invention to a diesel engine. FIG. 3A shows a time diagram showing the time period in which the electronic control device 10 of FIG. 1 sends a control pulse for a solenoid valve. FIG. 3B shows a series of the speed pulses produced by the incremental wheel 30 and the sensor 31. When the injection commences early, the pulses designated by 40 serve to determine the speed, when the injection commences late the pulses designated by 41 serve to determine the speed. FIG. 3C shows a diagram, referring to FIGS. 3A and 3B, of the cam lift over a period of time. In the time interval designated by 42, the injection pump delivers fuel to the cylinders of the internal combustion engine. In the activated state, the solenoid valve is closed. For the purpose of delivery, the solenoid valve seals the pump space in the time period designated by 42, so that pressure is built up.

Figure 4:
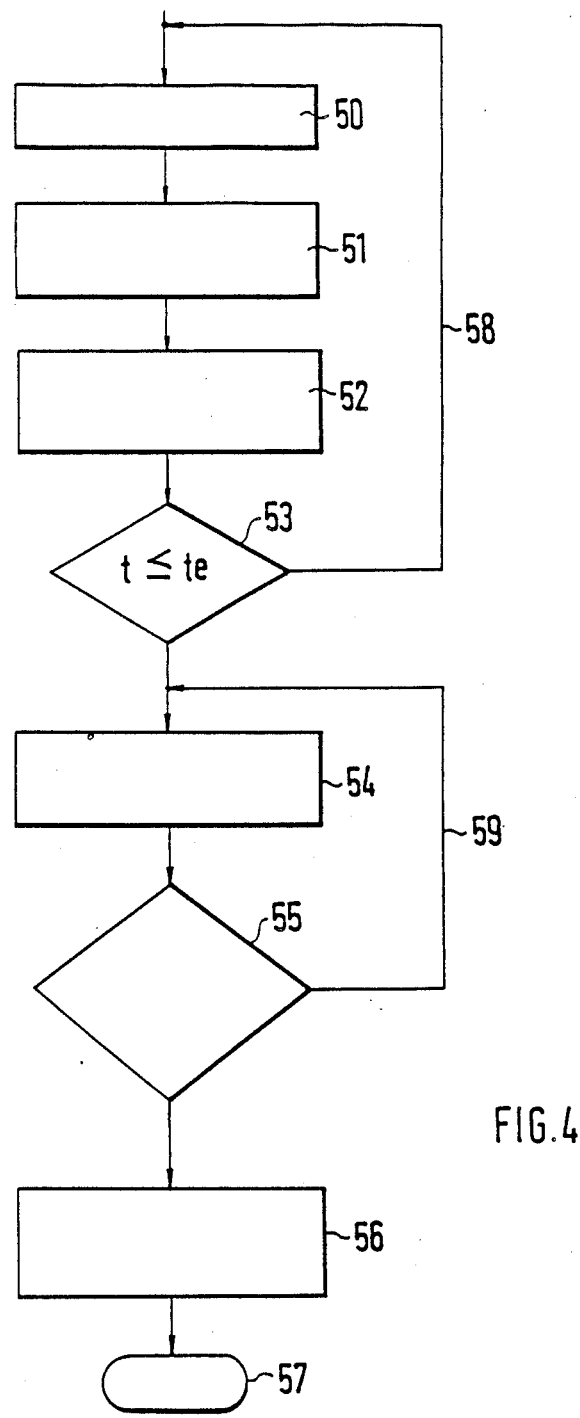

The flow chart shown in FIG. 4 explains the process through the example of the determination of the speed. The method step serving to determine an average value of the speed is designated by block 50. This average speed value is formed, for example, from the last final speed values. The point in time for the next detection of the signals, in this case, the next detection of speed signals, is determined in block 51. The number of increments of the incremental wheel for calculating the speed (accuracy of value) is determined in block 52 as a function of the operating parameters. At the same time, it can also be checked whether the current operating state of the internal combustion engine makes it possible to dispense with characteristic field evaluations which are not absolutely necessary (e.g. block 12 in FIG. 1) in the dynamically critical area. The required computing time is shortened by means of this step. In the decision block 53, it is to be decided whether or not the point in time for determining the speed has arrived. If this point in time has not arrived, the program jumps back to the beginning via 58. If the point in time has arrived, the speed is determined in block 54. In block 55 it is decided whether there is still time to modify the output signal or output signals to be calculated. If changes are possible, the speed signal is determined again in block 54. If changes are no longer possible, the output signals are calculated in block 56 and the corresponding control signals are sent. Next, this program area is abandoned in step 57 and the computer is available for carrying out other tasks.

The arrangement works in the following manner:

As a function of the mean value of the speed and other parameters, the microcomputer 11 determines 1. the quantity of increments required for determining the speed and
2. the relative position of these increments with reference to a crankshaft revolution
3. the possibly allowable reduction of computing time by omitting uncritical parts of the program.

The sum of the computing time and the signal detection time is made short enough in each instance by means of these three degrees of freedom that instabilities in the control circuit are prevented.

After releasing the control pulses, the microcomputer still has enough time to calculate other variables. It is also conceivable that the signal detection and the signal output overlap if the computing speed of the microcomputer allows such a manner of operation. In such a case, the fuel quantity value or the injection time can be brought to the respective current state.

What is claimed is:

1. An arrangement for detecting speed signals of an internal combustion engine, including actuation devices and a computerized electronic control device for generating control signals for controlling the actuation device, which control signals relate to specific cylinders of the engine, comprising an incremental speed transmitter having a segmented wheel connected to a crankshaft or a camshaft of the engine and a fixed sensor cooperating with segmented wheel to generate a speed signal in the form of a series of pulses; means for applying said speed signal to said electronic control device to generate a speed dependent control signal, said electronic control device including means for selecting a desired point in time of the detection of the speed signal within a revolution of the crankshaft or the camshaft, and means for selecting in dependency on a least one additional operational parameter of the engine a number of pulses in the speed signal.

2. Arrangement according to claim 1 wherein the point in time of the detection of the speed signal is controlled by said electronic control device in such a way that the time interval between the detection of the speed signal and the output of the control signal is minimal.

3. Arrangement according to claim 2 wherein the computing time is minimized by means of selecting a quantity of increments for determining the speed.

4. Arrangement according to claim 2 wherein the computing time is minimized by means of omitting characteristic field evaluations.

5. Arrangement according to claim 1 wherein the point in time of the speed detection depends on the average value of the speed.

6. Arrangement according to claim 1 wherein the point in time for the detection of the speed signal depends on a load signal.

7. Arrangement according to claim 1 wherein the following variables are calculated from the speed signal:
fuel quantity ($Q_K$)
commencement of injection (SB) and
duration of injection (SD).

* * * * *